(12) United States Patent
Ray et al.

(10) Patent No.: US 8,160,518 B2
(45) Date of Patent: Apr. 17, 2012

(54) MULTI-MODE TRANSCEIVER HAVING TUNABLE HARMONIC TERMINATION CIRCUIT AND METHOD THEREFOR

(75) Inventors: Marcus R. Ray, Chandler, AZ (US); Darrell G. Hill, Tempe, AZ (US); Ricardo A. Uscola, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 899 days.

(21) Appl. No.: 11/833,360

(22) Filed: Aug. 3, 2007

(65) Prior Publication Data

US 2008/0039025 A1 Feb. 14, 2008

(51) Int. Cl.
*H01Q 11/12* (2006.01)

(52) U.S. Cl. .................. 455/127.1; 455/102; 455/553.1; 455/83; 330/144; 330/149; 330/285; 330/302; 330/51; 330/85; 330/296; 330/133; 331/77; 331/96

(58) Field of Classification Search .................. 455/102, 455/83, 73, 143, 425, 126, 108, 110; 331/77, 331/96; 330/129, 149, 51, 302, 310, 56, 330/306, 85, 144, 285, 298, 296, 133
See application file for complete search history.

(56) References Cited

U.S. PATENT DOCUMENTS

| | | | | |
|---|---|---|---|---|
| 4,973,921 A * | 11/1990 | Cohen et al. | ...... | 331/77 |
| 5,471,164 A * | 11/1995 | Penny | ...... | 330/149 |
| 6,236,274 B1 * | 5/2001 | Liu | ...... | 330/302 |
| 6,373,331 B1 * | 4/2002 | Smiley et al. | ...... | 327/545 |
| 6,552,610 B1 * | 4/2003 | Grebennikov et al. | ...... | 330/251 |
| 6,690,238 B2 * | 2/2004 | Lautzenhiser et al. | ...... | 330/295 |
| 6,735,516 B1 * | 5/2004 | Manson | ...... | 701/209 |
| 6,747,517 B2 * | 6/2004 | Lautzenhiser et al. | ...... | 330/295 |
| 6,900,696 B2 * | 5/2005 | Lautzenhiser et al. | ...... | 330/295 |
| 7,145,394 B2 * | 12/2006 | Numanami et al. | ...... | 330/277 |
| 7,176,769 B1 * | 2/2007 | Ellis | ...... | 333/125 |
| 7,202,736 B1 * | 4/2007 | Dow et al. | ...... | 330/129 |
| 7,215,221 B1 * | 5/2007 | Ellis et al. | ...... | 333/125 |
| 7,268,626 B2 * | 9/2007 | Anand | ...... | 330/285 |
| 7,307,478 B2 * | 12/2007 | Anand | ...... | 330/285 |
| 7,539,462 B2 * | 5/2009 | Peckham et al. | ...... | 455/83 |
| 7,554,410 B2 * | 6/2009 | Kawashima et al. | ...... | 330/302 |
| 2004/0012445 A1 * | 1/2004 | Numanami et al. | ...... | 330/277 |
| 2005/0030094 A1 * | 2/2005 | Conrad et al. | ...... | 330/144 |
| 2007/0037530 A1 * | 2/2007 | Peckham et al. | ...... | 455/102 |
| 2007/0057731 A1 * | 3/2007 | Le | ...... | 330/302 |

\* cited by examiner

*Primary Examiner* — April G Gonzales
(74) *Attorney, Agent, or Firm* — Daniel D. Hill

(57) ABSTRACT

A transceiver includes a harmonic termination circuit that receives a tunable harmonic voltage from a power amplifier control. The harmonic termination circuit includes a variable capacitor that is capable of adjusting its capacitance in response to the tunable harmonic termination voltage to achieve at least two modes of operation. The at least two modes of operation may be EDGE mode and GSM mode. In this embodiment, the harmonic termination circuit allows for linearity specifications of EDGE to be met, while not degrading the efficiency of the transceiver when operating in GSM mode. In one embodiment, the harmonic termination circuit further includes an inductive element in series with the variable capacitor.

14 Claims, 2 Drawing Sheets

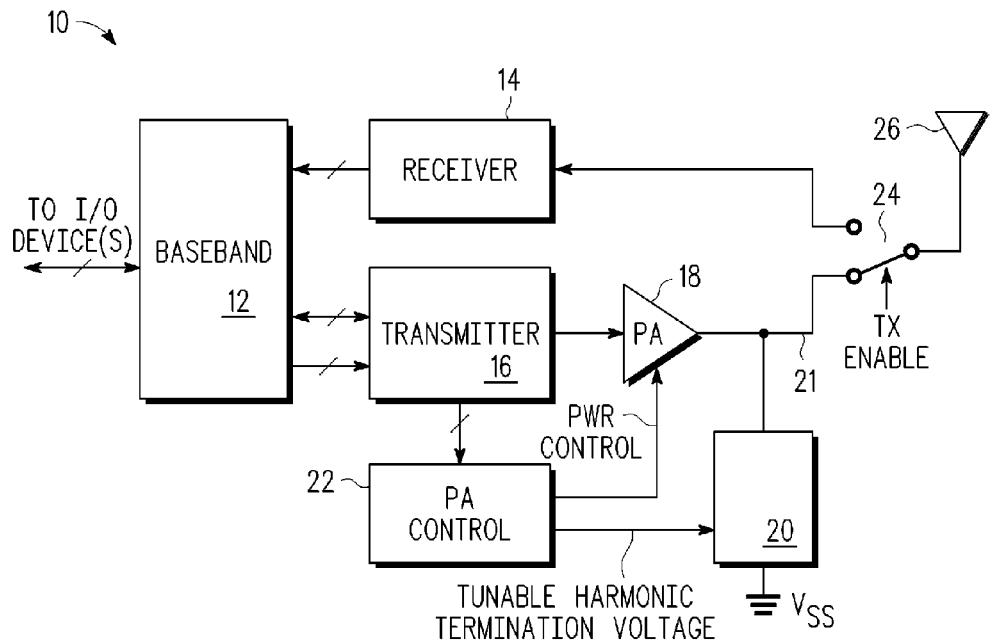
*FIG. 1*
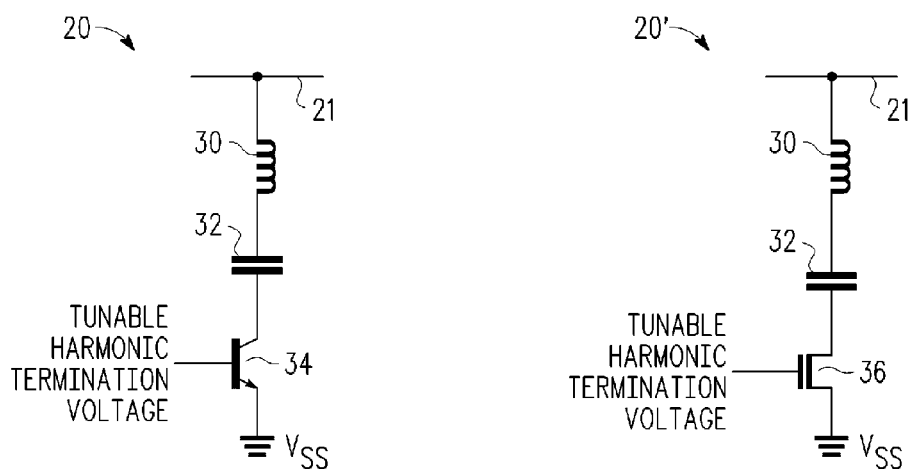
*FIG. 2*    *FIG. 3*

MULTI-MODE TRANSCEIVER HAVING TUNABLE HARMONIC TERMINATION CIRCUIT AND METHOD THEREFOR

BACKGROUND

1. Field

This disclosure relates generally to transceivers, and more specifically, to a multiple mode transceiver having a tunable harmonic termination circuit.

2. Related Art

Modern wireless communication devices typically contain a multiple mode transceiver that can transmit and receive several different signal types. For example, one transceiver may function as both a GSM and EDGE (enhanced data rates for GSM evolution) transceiver. A transmitter for transmitting a GSM (global system for mobile communication) signal uses a power amplifier (PA) that is non-linear to boost efficiency for use in battery operated devices. The PA can be non-linear because the GSM signal is phase modulated (PM) or frequency modulated (FM). On the other hand, an EDGE signal may be a combination PM and AM (amplitude modulation) signal that requires high linearity. A linear amplifier is relatively inefficient and consumes more power than the non-linear power amplifier. A multi-mode transceiver could include both a non-linear PA and a linear PA but that would increase the size and cost of an integrated circuit on which the transceiver is implemented.

Therefore, what is needed is a multiple mode transceiver that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 1 illustrates, in block diagram form, a transceiver in accordance with an embodiment.

FIG. 2 illustrates, in schematic diagram form, one embodiment of the harmonic termination circuit of FIG. 1.

FIG. 3 illustrates, in schematic diagram form, another embodiment of the harmonic determination circuit of FIG. 1.

DETAILED DESCRIPTION

Figure 4:
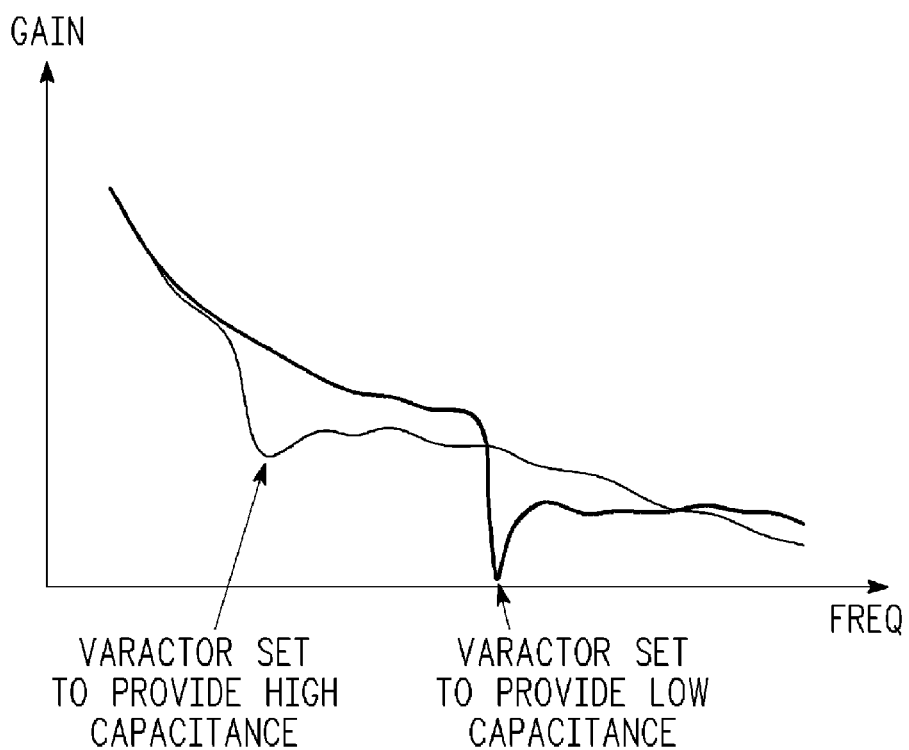
FIG. 4 illustrates a graph of the output of the power amplifier of FIG. 1 with different varactor capacitance values.

Generally, there is provided, a transceiver having a power amplifier that can provide a non-linear output signal when transmitting a GSM signal, and can provide a more linear output signal when transmitting an EDGE signal. This is accomplished using a harmonic termination circuit having a varactor, or voltage controlled capacitance, that tunes the resonance frequency of the power amplifier output when in EDGE mode, and re-tunes the resonance frequency of the power amplifier output when in GSM mode. In one embodiment, the varactor is implemented using a bipolar transistor and in another embodiment, the varactor is implemented using an FET (field effect transistor). Controlling a resonance frequency of the power amplifier output signal with the harmonic termination circuit allows one power amplifier to be used with both GSM and EDGE signals, without degrading the efficiency of the power amplifier when in GSM mode.

In one aspect, there is provided, a transceiver comprising: a power amplifier control; and a harmonic termination circuit coupled to the power amplifier control, wherein the harmonic termination circuit receives a tunable harmonic termination voltage from the power amplifier control, and wherein the harmonic termination circuit comprises: an inductive element; and a variable capacitor in series with the inductive element, wherein the variable capacitor is capable of adjusting its capacitance in response to the tunable harmonic termination voltage so as to achieve at least two modes of operation, wherein the at least two modes of operation are used to tune a harmonic termination. The variable capacitor, or varactor, is formed using a bipolar transistor or a field effect transistor. In one mode, the variable capacitor provides a relatively high capacitance in response to the harmonic termination voltage being at one voltage level to tune the resonance frequency of the harmonic termination circuit for more linear operation of the power amplifier. In another mode, the variable capacitor provides a relatively low capacitance in response to the harmonic termination voltage being at another voltage level to de-tune the power amplifier for less linear and more efficient operation.

In another aspect, there is provided, a transceiver comprising: a power amplifier; a power amplifier control, wherein the power amplifier control provides a tunable harmonic termination voltage; and a harmonic termination circuit coupled to the power amplifier, wherein the harmonic tunable circuit comprises a variable capacitor that is capable of being responsive to the tunable harmonic termination voltage, wherein a high capacitance is present in a first voltage mode and a low capacitance is present in a second voltage mode.

In yet another aspect, there is provided, a method for tuning a transceiver, the method comprising: providing a tunable harmonic termination voltage from a power amplifier control; and selecting between a high voltage mode and a low voltage mode, wherein the selecting comprises adjusting the capacitance of a variable capacitor in response to the tunable harmonic termination voltage.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a digital signal, status bit, or similar apparatus into its logically true or logically false state, respectively. If the logically true state is a logic level one, the logically false state is a logic level zero. And if the logically true state is a logic level zero, the logically false state is a logic level one.

Each digital signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 illustrates, in block diagram form, a transceiver 10 in accordance with an embodiment. The representation of transceiver 10 in FIG. 1 is highly simplified. One skilled in the art will realize that many different transceiver types may be used in accordance with the described embodiment. Transceiver 10 includes baseband circuit 12, receiver circuit 14, transmitter circuit 16, power amplifier (PA) 18, harmonic termination circuit 20, PA control circuit 22, switch 24, and antenna 26. Baseband circuit 12 includes a plurality of bidirectional terminals for coupling to a plurality of input and output or input/output (I/O) devices such as for example, a speaker, a display screen, a keyboard, and a microphone. Receiver 14 has a plurality of output terminals coupled to input terminals of baseband circuit 12, and a first terminal coupled to an input of switch 24. Switch 24 also includes a control terminal for receiving a control signal labeled "TX ENABLE", and another terminal coupled to antenna 26. Transmitter 16 has a plurality of bidirectional conductors coupled to baseband circuit 12 for providing and receiving control information, and a plurality of input terminals coupled to output terminals of baseband circuit 12 for receiving GSM and/or EDGE signals to be transmitted via PA 18 and antenna 26. PA 18 has an input coupled to transmitter 16 for receiving the GSM/EDGE signals, and an output terminal coupled to an input of switch 24. Transmitter 16 has a plurality of output terminals for providing control signals to PA control 22. Power amplifier control 22 includes a first output terminal for providing a power control signal labeled "PWR CONTROL" to a control input of PA 18, and a second output for providing a control signal labeled "TUNABLE HARMONIC TERMINATION VOLTAGE" to harmonic termination circuit 20. Harmonic termination circuit 20 has a first terminal coupled to the output of PA 18 at a node 21, and a second terminal coupled to a power supply voltage terminal labeled "VSS". Harmonic termination circuit 20 will be discussed below in more detail.

In operation, when transceiver 10 is in receive mode, switch 24 couples the input of receiver 14 to antenna 26 in response to a deasserted enable signal TX ENABLE. Note that in other embodiments, the logic of enable signal TX ENABLE may be reversed. The receiver will perform functions such as demodulating, decoding, decrypting, error checking, and digitizing the received signal for further processing by baseband circuit 12.

When transceiver 10 is in transmit mode, switch 24 couples the output of PA 18 to antenna 26 in response to an asserted control signal TX ENABLE. Transmitter 16 will perform functions such as modulating, encoding, encrypting, etc. Depending on the transmission mode, transmitter 16 provides either a GSM signal or an EDGE signal. Also, transmitter 16 can control the output power of PA 18 in either GSM or EDGE mode by causing PA control 22 to provide analog control signal PWR CONTROL. Power amplifier 18 can provide one of several power levels depending on the voltage of control signal PWR CONTROL. Also, the output of PA 18 may include a switchable load impedance (not shown) to allow the load impedance to be changed in response to changing the power level. Note that harmonic termination circuit 20 is different from, and provided in addition to, any load impedance. However, one skilled in the art will realize that a variable load impedance, if implemented, will be taken into account when choosing inductance and capacitance values for harmonic termination circuit 20.

If transmitter 16 is transmitting an EDGE signal, then PA control 22 provides bias voltage TUNABLE HARMONIC TERMINATION VOLTAGE at a voltage level designed to cause PA 18 to provide a linear output signal. If transmitter 16 is transmitting a GSM signal, then PA control 22 provides bias voltage TUNABLE HARMONIC TERMINATION VOLTAGE at a voltage level to "detune" harmonic termination circuit 20 to cause PA 18 to provide a more efficient non-linear signal.

FIG. 2 illustrates, in schematic diagram form, one embodiment of harmonic termination circuit 20 of FIG. 1. Harmonic termination circuit 20 includes an inductor 30, a capacitor 32, and a varactor. In the embodiment of FIG. 2, the varactor is implemented using an NPN hetrojunction bipolar transistor 34. Inductor 30 has a first terminal coupled to the output of PA 18 at node 21, and a second terminal. Capacitor 32 has a first plate electrode coupled to the second terminal of inductor 30, and a second plate electrode. transistor 34 has a first current electrode (collector) coupled to the second plate electrode of capacitor 32, a control electrode (base) coupled to receive control signal TUNABLE HARMONIC TERMINATION, and a second current electrode (emitter) coupled to power supply voltage terminal VSS. In the illustrated embodiment, VSS is coupled to ground. In other embodiments, VSS may be coupled to another potential. Also, note that in other embodiments, inductor 30 and capacitor 32 may be coupled together in a different order. That is, capacitor 32 may have a first plate electrode coupled directly to node 21. Inductor 30 would have a first terminal coupled to a second plate electrode of capacitor 32, and a second terminal of the inductor 30 would be coupled to the first current electrode of transistor 34.

Transistor 34 is implemented to function as a voltage controlled capacitor, or varactor. On skilled in the art will know how to implement a varactor with a bipolar transistor and therefore will not be discussed further. The capacitance stored by transistor 34 varies as a function of base voltage. The amount of variable capacitance provided by transistor 34 is combined, in series, to the capacitance of capacitor 32. Therefore, the inductance of inductor 30 and the capacitance of capacitors 32 and 34 can be chosen via the TUNABLE HARMONIC TERMINATION VOLTAGE to provide a shunt LC network 20 that results in a linear output signal at the output of PA 18 when transmitter 16 is transmitting an EDGE signal.

A power amplifier, such as power amplifier 18, operates more efficiently when providing a non-linear output voltage. Therefore, when transmitter 16 is operating in GSM mode, the shunt LC network provided by harmonic termination circuit 20 is "de-tuned" by changing the capacitance provided by transistor 34. Harmonic termination circuit 20 is de-tuned by changing the voltage level of bias voltage TUNABLE HARMONIC TERMINATION VOLTAGE. When de-tuned, harmonic termination circuit 20 causes the output of PA 18 to become more non-linear and therefore PA 18 operates more efficiently when in GSM transmit mode.

FIG. 3 illustrates, in schematic diagram form, harmonic determination circuit 20' of FIG. 1. Harmonic termination circuit 20' is the same as harmonic termination circuit 20 except that harmonic termination circuit 20' implements the varactor as an FET (field effect transistor) 36. Transistor 36 has a first current electrode (drain) coupled to the second plate electrode of capacitor 32, a second current electrode (source) coupled to VSS, and a control electrode (gate) coupled to VSS. One skilled in the art will know how to implement a varactor using an FET and therefore will not be discussed further. Harmonic termination circuit 20' functions the same as harmonic termination circuit 20 and provides the same advantages as discussed above.

FIG. 4 illustrates a graph of the output of the power amplifier of FIG. 1 using two different varactor capacitance values.

The graph of FIG. 4 shows two plots of the gain of the output signal of PA 18 versus frequency for two capacitance values for harmonic termination circuit 20. The resonance frequency for the output signals in FIG. 4 where the gain sharply digs. As can be seen in FIG. 4, lowering the capacitance causes the resonance frequency to increase, as indicated by the sharp "dip" in gain, thus causing the output of PA 18 to be more non-linear.

By now it should be appreciated that there has been provided a transceiver having a power amplifier that can provide a non-linear output signal when transmitting a GSM signal, and can provide a more linear output signal when transmitting an EDGE signal. This is accomplished using a harmonic termination circuit having a varactor, or voltage controlled capacitance, that tunes the resonance frequency of the power amplifier output when in EDGE mode, and de-tunes the resonance frequency of the power amplifier output when in GSM mode. In one embodiment, the varactor is implemented using a bipolar transistor and in another embodiment, the varactor is implemented using an FET transistor. This allows one PA to provide the output signal for both types of transmissions, thus reducing the size of an integrated circuit used to implement the transmitter.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different transceiver systems. For example, although FIG. 1 and the discussion thereof describe an exemplary transceiver, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of transceiver 10 are circuitry located on a single integrated circuit or within a same device. Alternatively, transceiver 10 may include any number of separate integrated circuits or separate devices interconnected with each other. For example, baseband circuit 12 may be located on a same integrated circuit as receiver 14 and transmitter 16, or on a separate integrated circuit or located within another peripheral or slave discretely separate from other elements of transceiver 10.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the varactor can be implemented using a plurality of selectable plate capacitors, or MOS (metal oxide semiconductor) transistors. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A circuit comprising:
a power amplifier having an input terminal coupled to an output terminal of a transmitter, a control terminal, and an output terminal for providing an output signal;
a harmonic termination circuit comprising an inductive element, a capacitor, and a varactor, the inductive element having a first terminal coupled to the output terminal of the power amplifier, and a second terminal; the capacitor having a first plate electrode coupled to the second terminal of the inductive element, and a second plate electrode; and the varactor having a first current electrode coupled to the second plate electrode of the capacitor, a second current electrode coupled to the power supply voltage terminal, and a control electrode; and a power amplifier control circuit having a first output terminal for providing a power control signal to the control terminal of the power amplifier, and a second output terminal for providing a tunable harmonic termination voltage to control a capacitance of the varactor, wherein the tunable harmonic termination voltage is provided at a first voltage level to cause the varactor to provide a first capacitance during a linear operating mode and the tunable harmonic termination voltage is provided at a second voltage level to cause the varactor to provide a second capacitance during a non-linear operating mode.

2. The circuit of claim 1, wherein the varactor is characterized as being a bipolar transistor.

3. The circuit of claim 1, wherein the varactor is characterized as being a field effect transistor.

4. The circuit of claim 1, wherein the output signal has a first resonance frequency during operation in the linear operating mode and the output signal has a second resonance frequency during operation in the non-linear operating mode.

5. The circuit of claim 1, wherein the linear operating mode is for transmitting an EDGE (Enhanced Data rates for Global system for mobile communication Evolution) signal, and the non-linear operating mode is for transmitting a GSM (Global System for Mobile communication) signal.

6. The circuit of claim 1, further comprising a multi-mode transmitter having an output terminal coupled to the input terminal of the power amplifier, wherein the multi-mode transmitter provides an EDGE (Enhanced Data rates for Global system for mobile communication Evolution) output signal when operating in the linear operating mode, and the multi-mode transmitter provides a GSM (Global System for Mobile communication) output signal when operating in the non-linear operating mode.

7. The circuit of claim 1, wherein the first capacitance is added to a capacitance of the capacitor with respect to the output terminal of the power amplifier when in the linear operating mode, and the second capacitance is added to the capacitance with respect to the output terminal of the power amplifier of the capacitor when in the non-linear operating mode.

8. A circuit comprising:

a power amplifier having an input terminal coupled to an output terminal of a transmitter, a control terminal, and an output terminal for providing an output signal;

a harmonic termination circuit comprising:

an inductive element having a first terminal coupled to the output terminal of the power amplifier, and a second terminal;

a capacitor having a first plate electrode coupled to the second terminal of the inductive element, and a second plate electrode; and a varactor having a first current electrode coupled to the second plate electrode of the capacitor, a second current electrode coupled to a power supply voltage terminal, and a control electrode; and a power amplifier control circuit having a first output terminal for providing a power control signal to the control terminal of the power amplifier, and a second output terminal for providing a tunable harmonic termination voltage to the control electrode of the varactor, wherein the tunable harmonic termination voltage is provided at a first voltage level to cause the varactor to provide a first capacitance during a linear operating mode and the tunable harmonic termination voltage is provided at a second voltage level to cause the varactor to provide a second capacitance during a non-linear operating mode.

9. The circuit of claim 7, wherein the varactor is characterized as being a bipolar transistor.

10. The circuit of claim 7, wherein the varactor is characterized as being a field effect transistor.

11. The circuit of claim 7, wherein the output signal has a first resonance frequency during operation in the linear operating mode and the output signal has a second resonance frequency during operation in the non-linear operating mode.

12. The circuit of claim 7, wherein the linear operating mode is for transmitting an EDGE (Enhanced Data rates for Global system for mobile communication Evolution) signal, and the non-linear operating mode is for transmitting a GSM (Global System for Mobile communication) signal.

13. The circuit of claim 7, further comprising a multi-mode transmitter having an output terminal coupled to the input terminal of the power amplifier, wherein the multi-mode transmitter provides an EDGE (Enhanced Data rates for Global system for mobile communication Evolution) signal when operating in the linear operating mode, and the multi-mode transmitter provides a GSM (Global System for Mobile communication) signal when operating in the non-linear operating mode.

14. The circuit of claim 7, wherein the first capacitance is added to a capacitance of the capacitor with respect to the output terminal of the power amplifier when in the linear operating mode, and the second capacitance is added to the capacitance of the capacitor with respect to the output terminal of the power amplifier when in the non-linear operating mode.

* * * * *